United States Patent
Hasebe (10) Patent No.: US 12,169,797 B2
(45) Date of Patent: Dec. 17, 2024

(54) OPERATION MANAGEMENT APPARATUS, SYSTEM, AND OPERATION MANAGEMENT METHOD

(71) Applicant: TOYOTA JIDOSHA KABUSHIKI KAISHA, Toyota (JP)

(72) Inventor: Yoshinori Hasebe, Owariasahi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 73 days.

(21) Appl. No.: 18/053,258

(22) Filed: Nov. 7, 2022

(65) Prior Publication Data

US 2023/0145366 A1    May 11, 2023

(30) Foreign Application Priority Data

Nov. 5, 2021   (JP) .................................. 2021-181516

(51) Int. Cl.
*G06Q 10/0631* (2023.01)
(52) U.S. Cl.
CPC .............................. *G06Q 10/06311* (2013.01)
(58) Field of Classification Search
CPC .. G06Q 10/06; G06Q 10/063; G06Q 10/0631; G06Q 10/06311
See application file for complete search history.

(56) References Cited

U.S. PATENT DOCUMENTS

| | | | |
|---|---|---|---|
| 5,799,263 A * | 8/1998 | Culbertson | G08G 1/123 340/994 |
| 2018/0211541 A1 * | 7/2018 | Rakah | G06Q 50/40 |
| 2019/0156254 A1 * | 5/2019 | Hansen | G06Q 10/02 |
| 2019/0197325 A1 * | 6/2019 | Reiley | G08B 21/24 |
| 2019/0228358 A1 | 7/2019 | Ootsuka et al. | |
| 2020/0393256 A1 * | 12/2020 | Sahin | G06Q 10/063 |

(Continued)

FOREIGN PATENT DOCUMENTS

| | | |
|---|---|---|
| JP | 2005-258840 A | 9/2005 |
| JP | 2021-096661 A | 6/2021 |
| WO | 2018087811 A1 | 5/2018 |

OTHER PUBLICATIONS

Babak, M., Yongzhe, Y., & Sushreeta, M. (2020). Analytical models for comparing operational costs of regular bus and semi-flexible transit services. Public Transport, 12(1), 147-169. (Year: 2020).*

*Primary Examiner* — William S Brockington, III
(74) *Attorney, Agent, or Firm* — Oliff PLC (57) ABSTRACT

An operation management apparatus includes a controller that acquires performance data indicating a usage record of vehicles, predicts, based on the performance data, a ride demand, determines to operate each vehicle as a regularly scheduled vehicle during the time slot when a first predicted value of the ride demand is higher than a first threshold, determines to operate each vehicle as a non-scheduled vehicle during the time slot when the first predicted value is not higher than the first threshold, acquires status data indicating an existence status of a user when each vehicle is operated as a regularly scheduled vehicle during the time slot, predicts a ride demand during a remaining time of the time slot based on the status data, and determines to introduce an additional vehicle onto the route for the remaining time when a second predicted value of the ride demand is higher than a second threshold.

20 Claims, 10 Drawing Sheets

(56) References Cited

U.S. PATENT DOCUMENTS

2021/0020047 A1* 1/2021 Kuhn .................... G08G 1/127
2021/0183250 A1   6/2021 Kaneichi
2022/0067869 A1* 3/2022 Warmoth ......... G06Q 10/06315

* cited by examiner

OPERATION MANAGEMENT APPARATUS, SYSTEM, AND OPERATION MANAGEMENT METHOD

CROSS-REFERENCE TO RELATED APPLICATION

This application claims priority to Japanese Patent Application No. 2021-181516 filed on Nov. 5, 2021, the entire contents of which are incorporated herein by reference.

TECHNICAL FIELD

The present disclosure relates to an operation management apparatus, a system, and an operation management method.

BACKGROUND

Patent Literature (PTL) 1 describes the creation of a vehicle dispatch plan according to vehicle dispatch conditions desired by the user.

CITATION LIST

Patent Literature

PTL 1: JP 2021-096661 A

SUMMARY

In PTL 1, the prediction of ride demand by users for vehicles is not at all considered. It is therefore difficult to operate vehicles in response to increases or decreases in ride demand.

It would be helpful to facilitate the operation of vehicles in response to increases or decreases in ride demand.

An operation management apparatus according to the present disclosure includes a controller configured to acquire performance data indicating a usage record of a plurality of vehicles that travel along a predetermined route, predict, based on the acquired performance data, a ride demand during a time slot in which each vehicle is operated, determine to operate each vehicle as a regularly scheduled vehicle during the time slot in a case in which a resulting first predicted value of the ride demand is higher than a first threshold, determine to operate each vehicle as a non-scheduled vehicle, which is dispatched in response to an individual request from a user, during the time slot in a case in which the first predicted value is equal to or less than the first threshold, acquire status data indicating an existence status of at least one user when each vehicle is operated as a regularly scheduled vehicle during the time slot, predict a ride demand during a remaining time of the time slot based on the acquired status data, and determine to introduce an additional vehicle onto the route for the remaining time in a case in which a resulting second predicted value of the ride demand is higher than a second threshold.

An operation management method according to the present disclosure includes:
- acquiring performance data indicating a usage record of a plurality of vehicles that travel along a predetermined route;
- predicting, based on the acquired performance data, a ride demand during a time slot in which each vehicle is operated, determining to operate each vehicle as a regularly scheduled vehicle during the time slot in a case in which a resulting first predicted value of the ride demand is higher than a first threshold, and determining to operate each vehicle as a non-scheduled vehicle, which is dispatched in response to an individual request from a user, during the time slot in a case in which the first predicted value is equal to or less than the first threshold;
- acquiring status data indicating an existence status of at least one user when each vehicle is operated as a regularly scheduled vehicle during the time slot; and
- predicting a ride demand during a remaining time of the time slot based on the acquired status data and determining to introduce an additional vehicle onto the route for the remaining time in a case in which a resulting second predicted value of the ride demand is higher than a second threshold.

According to the present disclosure, operation of vehicles in response to increases or decreases in ride demand is facilitated.

DETAILED DESCRIPTION

Hereinafter, embodiments of the present disclosure will be described with reference to the drawings.

In the drawings, the same or corresponding portions are denoted by the same reference numerals. In the descriptions of the embodiments, detailed descriptions of the same or corresponding portions are omitted or simplified, as appropriate.

An embodiment of the present disclosure will be described.

Figure 1:
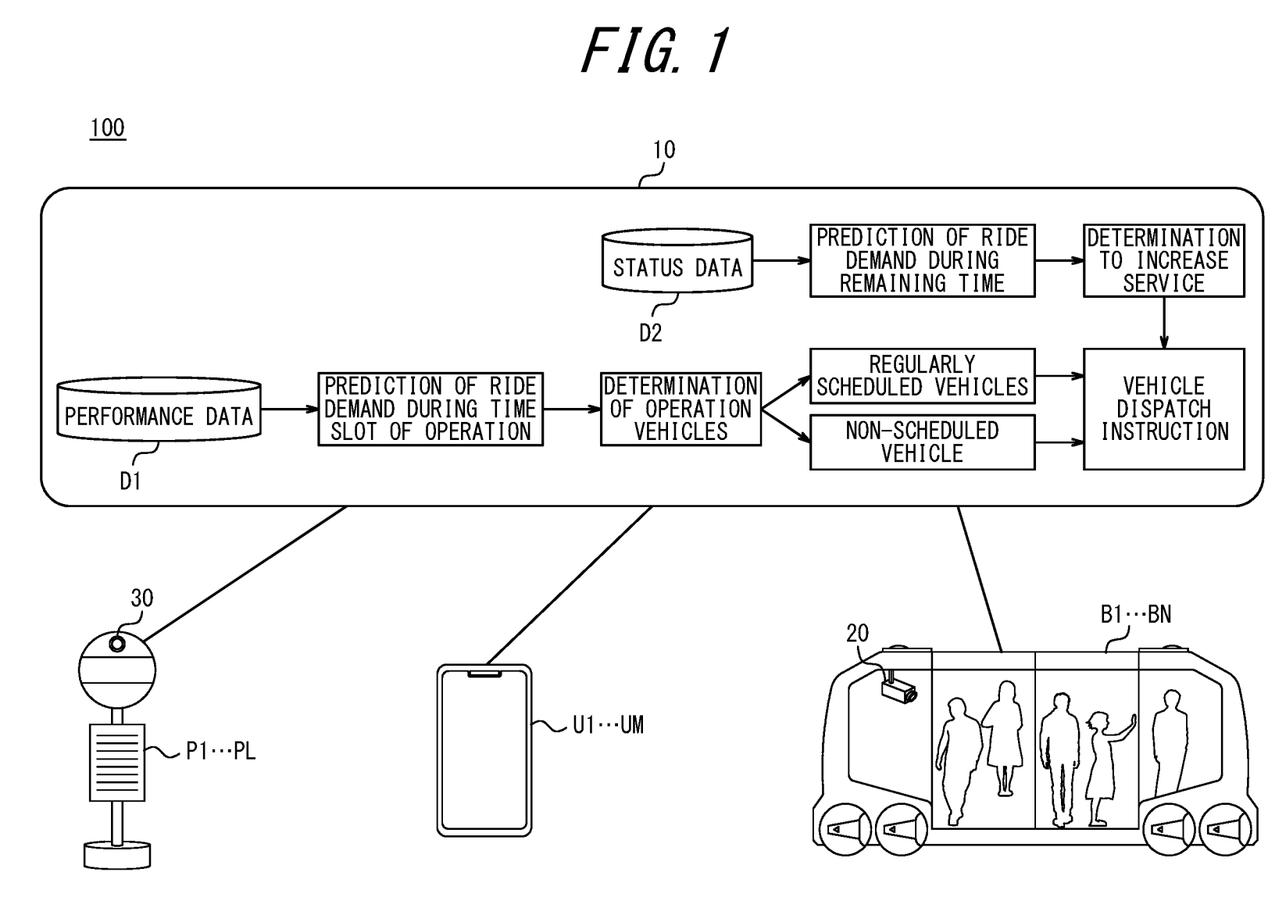
FIG. 1 is a diagram illustrating a configuration of a system according to an embodiment of the present disclosure.

A configuration of a system 100 according to the present embodiment will be described with reference to FIG. 1.

The system 100 according to the present embodiment includes an operation management apparatus 10, a plurality of vehicles B1, . . . , BN, a plurality of terminal apparatuses U1, . . . , UM, and a plurality of stops P1, . . . , PL arranged at a plurality of stopping points. The number of vehicles N, the number of terminal apparatus M, and the number of stops L are integers equal to or greater than 2.

The operation management apparatus 10 can communicate with the plurality of vehicles B1, ..., BN via the Internet, at least one WAN, at least one MAN, or any combination thereof. The term "WAN" is an abbreviation of wide area network. The term "MAN" is an abbreviation of metropolitan area network. The operation management apparatus 10 can communicate with the plurality of terminal apparatuses U1, ..., UM via the Internet, at least one WAN, at least one MAN, or any combination thereof. The operation management apparatus 10 can communicate with the plurality of stops P1, ..., PL via the Internet, at least one WAN, at least one MAN, or any combination thereof.

The operation management apparatus 10 is installed in a facility such as a data center. The operation management apparatus 10 is a computer such as a server that belongs to a cloud computing system or another type of computing system.

Each vehicle among the plurality of vehicles B1, ..., BN is, for example, any type of automobile such as a gasoline vehicle, a diesel vehicle, a hydrogen vehicle, an HEV, a PHEV, a BEV, or an FCEV. The term "HEV" is an abbreviation of hybrid electric vehicle. The term "PHEV" is an abbreviation of plug-in hybrid electric vehicle. The term "BEV" is an abbreviation of battery electric vehicle. The term "FCEV" is an abbreviation of fuel cell electric vehicle. Each vehicle is an autonomous vehicle in the present embodiment. An autonomous vehicle is a vehicle whose operation is automated at any given level. The automation level is, for example, any one of Level 1 to Level 5 according to the level classification defined by the SAE. The name "SAE" is an abbreviation of Society of Automotive Engineers. All the driving operations of each vehicle may be performed by a driver. Each vehicle may be a MaaS-dedicated vehicle. The term "MaaS" is an abbreviation of Mobility as a Service. Each vehicle includes a first sensor 20. The first sensor 20 is a camera in the present embodiment but may be any appropriate sensor, such as a pressure sensor, infrared sensor, or visible light sensor, that can detect the presence of an object and provide information on the detected object to the operation management apparatus 10.

Each stop among the plurality of stops P1, ..., PL includes a second sensor 30. The second sensor 30 is a camera in the present embodiment but may be any sensor, such as a pressure sensor, infrared sensor, or visible light sensor, that can detect the presence of an object and provide information on the detected object to the operation management apparatus 10.

An outline of the present embodiment will be described with reference to FIG. 1.

The operation management apparatus 10 acquires performance data D1 indicating a usage record of the plurality of vehicles B1, ..., BN that travel along a predetermined route. Based on the acquired performance data D1, the operation management apparatus 10 predicts the ride demand during a time slot in which each vehicle is operated. The operation management apparatus 10 determines to operate each vehicle as a regularly scheduled vehicle during the time slot in a case in which the resulting first predicted value of the ride demand is higher than a first threshold. In the present embodiment, a regularly scheduled vehicle stops at each stop among the plurality of stops P1, ..., PL according to a predetermined schedule. The mode of operation in which each vehicle is operated as a regularly scheduled vehicle is called a "regular fixed route operation mode M1". The operation management apparatus 10 determines to operate each vehicle as a non-scheduled vehicle, which is dispatched in response to an individual request from a user, during the time slot in a case in which the first predicted value is equal to or less than the first threshold. In the present embodiment, non-scheduled vehicles stop at a stop designated by the user among the stops P1, ..., PL at a time designated by the user. The mode of operation in which each vehicle is operated as a non-scheduled vehicle is called a "semi-demand operation mode M2". The operation management apparatus 10 acquires status data D2 indicating the existence status of at least one user when each vehicle is operated as a regularly scheduled vehicle during the time slot. In the present embodiment, the status data D2 is data indicating the status of at least one user in relation to each vehicle as the existence status of the user, i.e., whether at least one user is on-board the vehicle or waiting at one of the stops. Based on the acquired status data D2, the operation management apparatus 10 predicts the ride demand during the remaining time of the time slot. The operation management apparatus 10 determines to introduce an additional vehicle onto the route for the remaining time in a case in which the resulting second predicted value of the ride demand is higher than a second threshold. The additional vehicle is, for example, any type of automobile such as a gasoline vehicle, a diesel vehicle, a hydrogen vehicle, an HEV, a PEHV, a BEV, or an FCEV. The additional vehicle is an autonomous vehicle in the present embodiment but may be driven by a driver. The additional vehicle may be a MaaS-dedicated vehicle. The mode of operation in which an additional vehicle is operated in addition to the regularly scheduled vehicles is called an "increased service mode M3". Although the operation management apparatus 10 directly provides vehicle dispatch instructions for regularly scheduled vehicles, non-scheduled vehicles, and additional vehicles in the present embodiment, the operation management apparatus 10 may have an operation manager provide the vehicle dispatch instructions. In the present embodiment, the plurality of vehicles B1, ..., BN and the additional vehicles are circulating buses.

According to the present embodiment, operation of vehicles in response to increases or decreases in ride demand is facilitated by predicting the ride demand during a time slot in which each vehicle operates and during the remaining time of the time slot.

Figure 2:
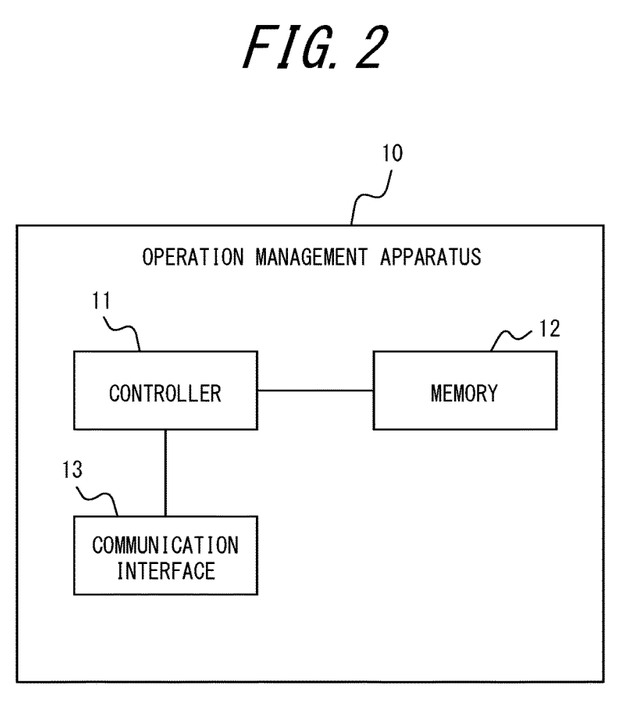
FIG. 2 is a block diagram illustrating a configuration of an operation management apparatus according to an embodiment of the present disclosure.

A configuration of the operation management apparatus 10 according to the present embodiment will be described with reference to FIG. 2.

The operation management apparatus 10 includes a controller 11, a memory 12, and a communication interface 13.

The controller 11 includes at least one processor, at least one programmable circuit, at least one dedicated circuit, or any combination thereof. The processor is a general purpose processor such as a CPU or a GPU, or a dedicated processor that is dedicated to specific processing. The term "CPU" is an abbreviation of central processing unit. The term "GPU" is an abbreviation of graphics processing unit. The programmable circuit is, for example, an FPGA. The term "FPGA" is an abbreviation of field-programmable gate array. The dedicated circuit is, for example, an ASIC. The term "ASIC" is an abbreviation of application specific integrated circuit. The controller 11 executes processes related to operations of the operation management apparatus 10 while controlling components of the operation management apparatus 10.

The memory 12 includes at least one semiconductor memory, at least one magnetic memory, at least one optical memory, or any combination thereof. The semiconductor memory is, for example, RAM or ROM. The term "RAM" is an abbreviation of random access memory. The term "ROM" is an abbreviation of read only memory. The RAM is, for example, SRAM or DRAM. The term "SRAM" is an abbreviation of static random access memory. The term "DRAM" is an abbreviation of dynamic random access memory. The ROM is, for example, EEPROM. The term "EEPROM" is an abbreviation of electrically erasable programmable read only memory. The memory 12 functions as, for example, a main memory, an auxiliary memory, or a cache memory. The memory 12 stores data to be used for the operations of the operation management apparatus 10 and data obtained by the operations of the operation management apparatus 10. The performance data D1 and the status data D2 are stored in the memory 12 in the present embodiment but may be stored in an external storage. The external storage is connected to the operation management apparatus 10.

The communication interface 13 includes at least one interface for communication. The interface for communication is, for example, a LAN interface. The term "LAN" is an abbreviation of local area network. The communication interface 13 receives data to be used for the operations of the operation management apparatus 10, and transmits data obtained by the operations of the operation management apparatus 10. The communication interface 13 receives the results of observations made by the first sensor 20 installed in each vehicle. The first sensor 20 is installed in each vehicle to observe how many users are on board the vehicle. The communication interface 13 receives the results of observations made by the second sensors 30 installed on the route. The second sensor 30 is installed at each of the stops P1, . . . , PL to observe how many users are waiting for each vehicle.

The functions of the operation management apparatus 10 are realized by execution of a program according to the present embodiment by a processor serving as the controller 11. That is, the functions of the operation management apparatus 10 are realized by software. The program causes a computer to execute the operations of the operation management apparatus 10, thereby causing the computer to function as the operation management apparatus 10. That is, the computer executes the operations of the operation management apparatus 10 in accordance with the program to thereby function as the operation management apparatus 10.

The program can be stored on a non-transitory computer readable medium. The non-transitory computer readable medium is, for example, flash memory, a magnetic recording device, an optical disc, a magneto-optical recording medium, or ROM. The program is distributed, for example, by selling, transferring, or lending a portable medium such as an SD card, a DVD, or a CD-ROM on which the program is stored. The term "SD" is an abbreviation of Secure Digital. The term "DVD" is an abbreviation of digital versatile disc. The term "CD-ROM" is an abbreviation of compact disc read only memory. The program may be distributed by storing the program in a storage of a server and transferring the program from the server to another computer. The program may be provided as a program product.

For example, the computer temporarily stores, in a main memory, a program stored in a portable medium or a program transferred from a server. Then, the computer reads the program stored in the main memory using a processor and executes processes in accordance with the read program using the processor. The computer may read a program directly from the portable medium and execute processes in accordance with the program. The computer may, each time a program is transferred from the server to the computer, sequentially execute processes in accordance with the received program. Instead of transferring a program from the server to the computer, processes may be executed by a so-called ASP type service that realizes functions only by execution instructions and result acquisitions. The term "ASP" is an abbreviation of application service provider. Programs encompass information that is to be used for processing by an electronic computer and is thus equivalent to a program. For example, data that is not a direct command to a computer but has a property that regulates processing of the computer is "equivalent to a program" in this context.

Some or all of the functions of the operation management apparatus 10 may be realized by a programmable circuit or a dedicated circuit serving as the controller 11. That is, some or all of the functions of the operation management apparatus 10 may be realized by hardware.

Operations of the operation management apparatus 10 according to the present embodiment will be described with reference to FIG. 3. These operations correspond to an operation management method according to the present embodiment.

Figure 7:
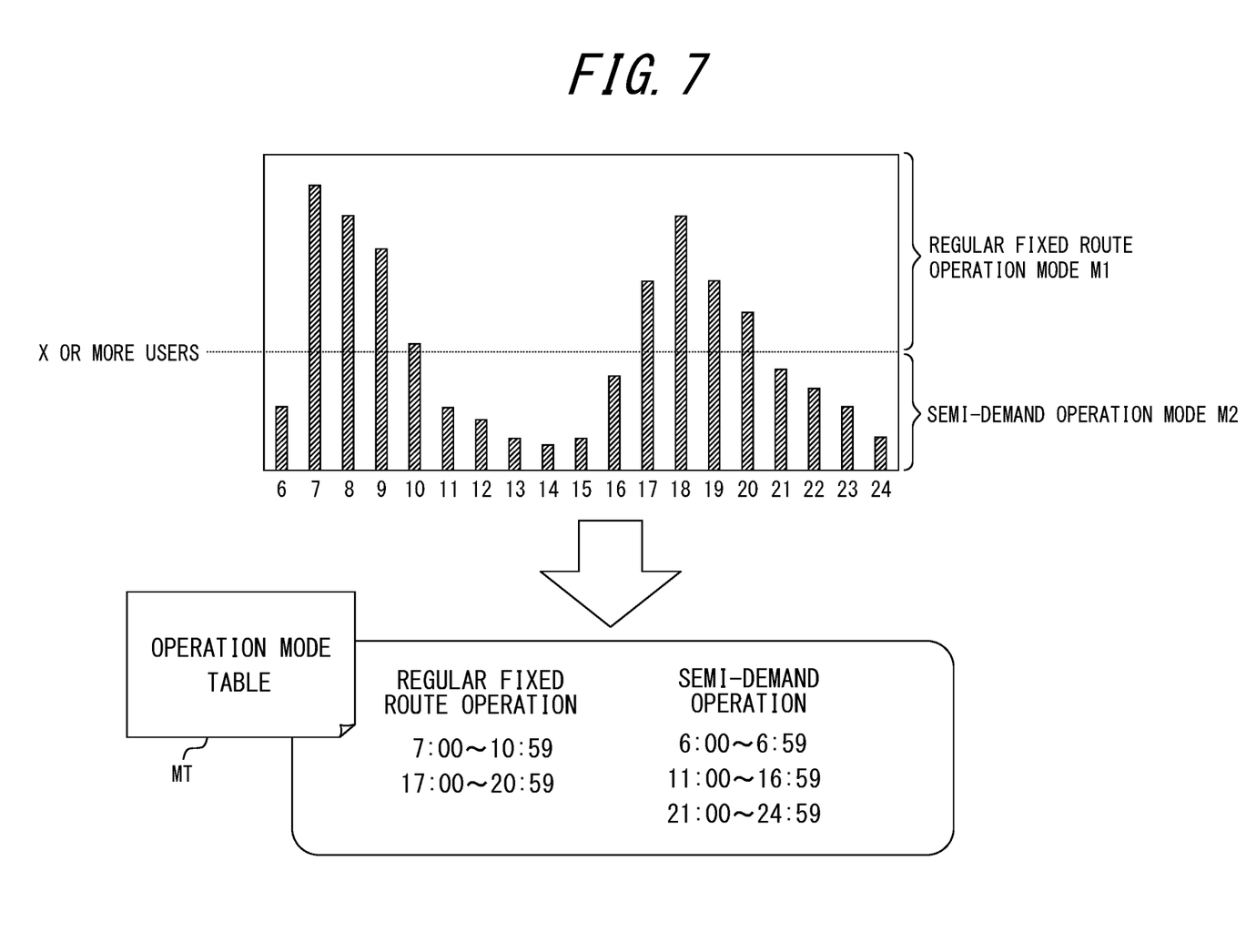
FIG. 7 is a diagram illustrating an example of creation of the operation mode table.

In step S101, the controller 11 of the operation management apparatus 10 acquires performance data D1 indicating a usage record of the plurality of vehicles B1, . . . , BN that travel along a predetermined route. Specifically, the controller 11 retrieves from the memory 12 the performance data D1, which includes data indicating the average number of users on board the plurality of vehicles B1, . . . , BN in each time slot during a tally period. The number of vehicles N can be set appropriately by the operation manager. For example, if the average number of users during the time slot with the highest average number of users as indicated by the performance data D1 is 30 and the capacity of each vehicle is 10, then N may be set to 30/10, i.e., 3. The tally period can be set appropriately by the operation manager. For example, the tally period may be set to the past month or longer before the operation date in a case of emphasizing a trend in the ride demand immediately preceding the operation date, or to a one day or longer period that includes the date corresponding to the operation date in the previous year in a case of emphasizing seasonal variation in the ride demand. The graph in the upper tier of FIG. 7 is an example of plotting the performance data D1, with the horizontal axis representing the time slot and the vertical axis representing the average number of users.

In step S102, the controller 11 of the operation management apparatus 10 predicts, based on the performance data D1 acquired in step S101, the ride demand during a time slot TX in which each vehicle is operated. As a result, a first predicted value of the ride demand during the time slot TX is obtained. Specifically, the controller 11 refers to the performance data D1 to identify the average number per vehicle of users who used the plurality of vehicles B1, . . . , BN during the tally period for each time slot. The controller 11 uses the value indicating the average number of users per vehicle identified for the time slot TX as the first predicted value of ride demand during the time slot TX.

In step S103, the controller 11 of the operation management apparatus 10 determines whether the first predicted value of the ride demand obtained in step S102 is higher than the first threshold. Specifically, the controller 11 sets the minimum number of users X per vehicle as the first threshold. X can be set appropriately by the operation manager, but in the present embodiment, X is set to the break-even point per vehicle. In other words, X is set to the value that yields a profit if the average number per vehicle of users that use the plurality of vehicles B1, . . . , BN is greater than that value. For example, X can be calculated from the daily operating costs of the plurality of vehicles B1, . . . , BN, the daily operating hours of the plurality of vehicles B1, . . . , BN, and the fare revenue per user. In the present embodiment, the first threshold varies according to the operation date on which each vehicle is operated.

Figure 8:
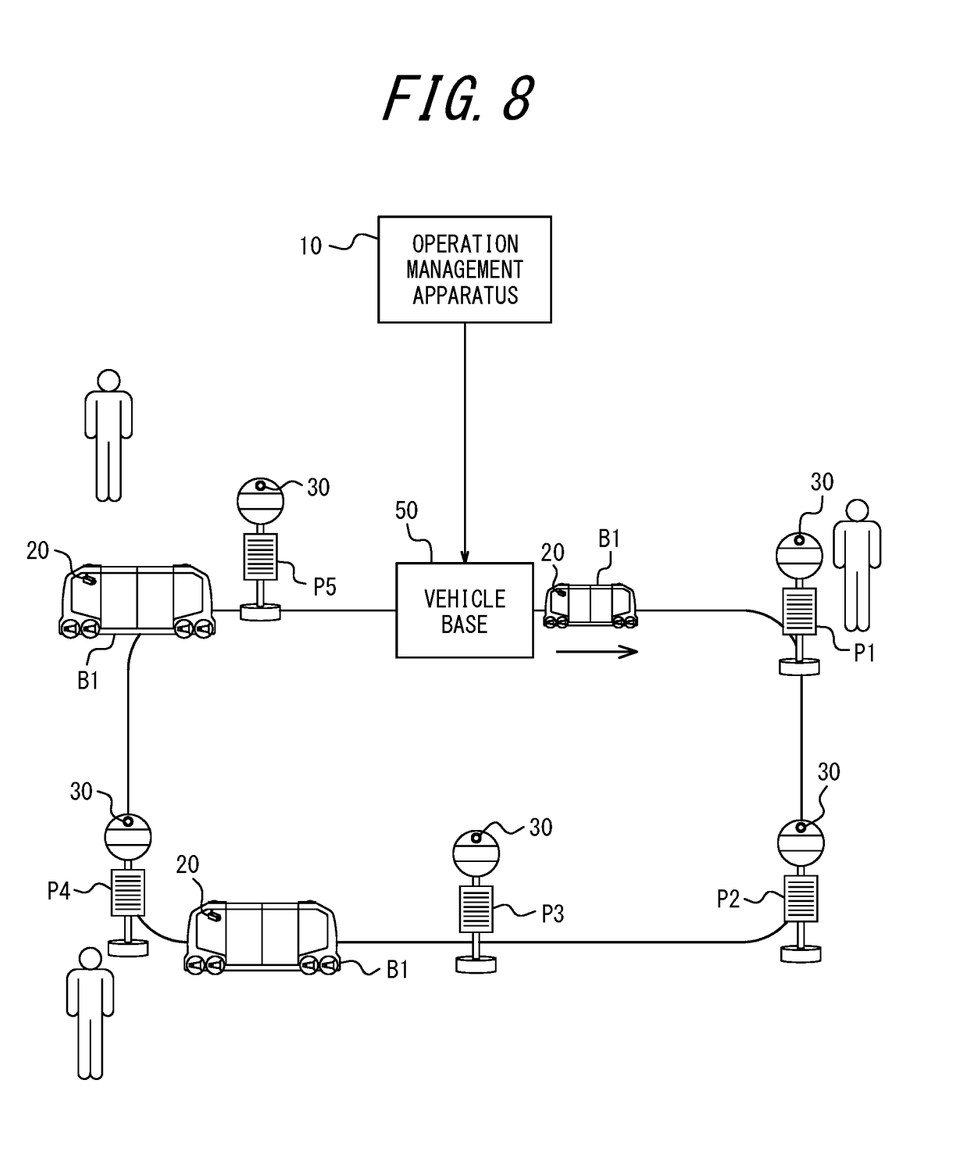
FIG. 8 is a diagram illustrating a specific example of a regular fixed route operation mode.

The controller 11 determines in step S104 to operate each vehicle as a regularly scheduled vehicle during the time slot TX in a case in which the first predicted value is determined to be higher than the first threshold. That is, the controller 11 sets the operation mode for the time slot TX to the regular fixed route operation mode M1. FIG. 8 illustrates a specific example of the regular fixed route operation mode M1. In the example illustrated in FIG. 8, after waiting at a vehicle base 50, the vehicle B1, which is one vehicle among the plurality of vehicles B1, . . . , BN, stops in order from stops P1 to P5 repeatedly as a regularly operating vehicle and then returns to the vehicle base 50. Users board the vehicle B1 at one of the stops P1 to P5 and alight from the vehicle B1 at one of the stops P1 to P5. The other vehicles B2, . . . also depart sequentially from the vehicle base 50 following the vehicle B1 and, like the vehicle B1, stop in order from the stops P1 to P5 repeatedly as regularly operating vehicles and then return to the vehicle base 50.

Figure 9:
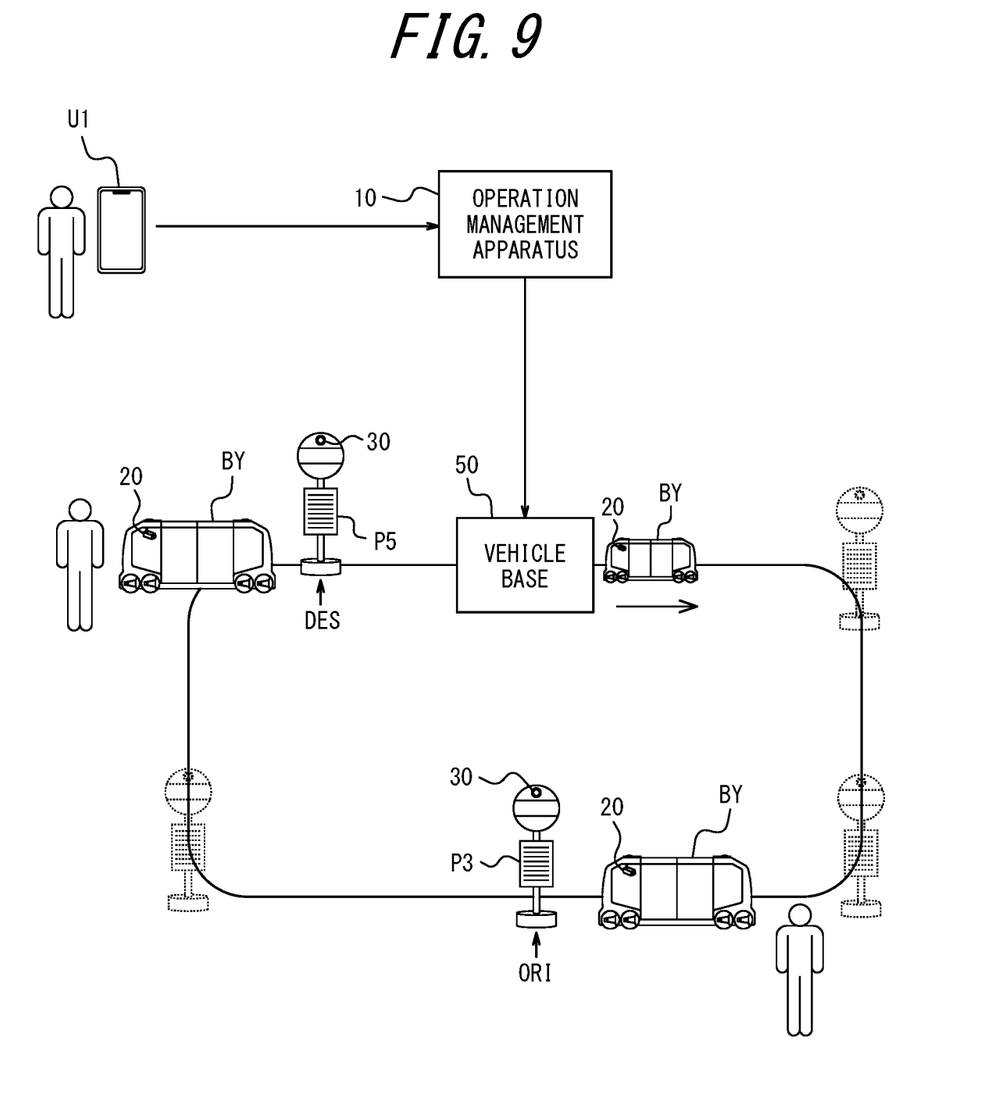
FIG. 9 is a diagram illustrating a specific example of a semi-demand operation mode.

The controller 11 determines in step S109 to operate each vehicle as a non-scheduled vehicle during the time slot TX in a case in which the first predicted value is determined to be equal to or less than the first threshold. That is, the controller 11 sets the operation mode for the time slot TX to the semi-demand operation mode M2. The flow in FIG. 3 then ends. FIG. 9 illustrates a specific example of the semi-demand operation mode M2. In the example illustrated in FIG. 9, a vehicle BY, which is one vehicle among the plurality of vehicles B1, . . . , BN, is selected while on standby at the vehicle base 50 and operated as a non-scheduled vehicle to be dispatched in response to an individual request from a user. The communication interface 13 of the operation management apparatus 10 receives a vehicle dispatch request from the terminal apparatus U1 of the user. The vehicle dispatch request contains information requesting that a vehicle be dispatched to the stop corresponding to an origin ORI specified by the user at the time specified by the user. The vehicle dispatch request may include information indicating the stop corresponding to a destination DES specified by the user. In the example in FIG. 9, it is assumed that the stop P3 corresponds to the origin ORI. It is assumed that the stop P5 corresponds to the destination DES. The controller 11 of the operation management apparatus 10 acquires information indicated by the vehicle dispatch request received by the communication interface 13. The controller 11 creates an operation plan for a non-scheduled vehicle according to the acquired information. The "operation plan for a non-scheduled vehicle" refers to the operation schedule of a non-scheduled vehicle in the semi-demand operation mode M2. Specifically, the operation plan for a non-scheduled vehicle includes data indicating when and where the non-scheduled vehicle is to stop, i.e., the stops where the non-scheduled vehicle is to stop and the corresponding stop times. The controller 11 transmits the created operation plan for a non-scheduled vehicle to the vehicle BY. After departing from the vehicle base 50, the vehicle BY passes through the stops P1 and P2 and stops at the stop P3 at the time specified by the user. The user boards the vehicle BY at the stop P3. After departing from the stop P3, the vehicle BY passes through the stop P4 and stops at the stop P5. The user alights from the vehicle BY at the stop P5. After departing from the stop P5, the vehicle BY returns to the vehicle base 50.

Based on the acquired performance data D1, the controller 11 thus predicts the ride demand during a time slot TX in which each vehicle is operated. The controller 11 determines to operate each vehicle as a regularly scheduled vehicle during the time slot TX in a case in which the resulting first predicted value of the ride demand is higher than the first threshold. The controller 11 determines to operate each vehicle as a non-scheduled vehicle during the time slot TX in a case in which the first predicted value is equal to or less than the first threshold.

Figure 5:
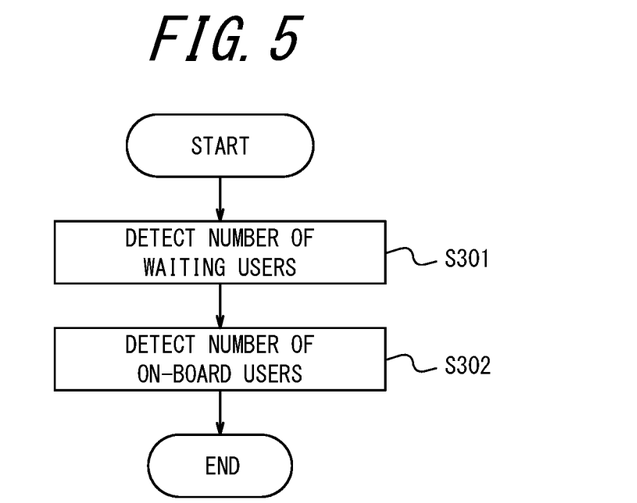
FIG. 5 is a flowchart illustrating the details of a process to acquire status data.

In step S105, the controller 11 of the operation management apparatus 10 acquires status data D2 indicating an existence status of at least one user when each vehicle is operated as a regularly scheduled vehicle during the time slot TX for which it was determined in step S104 to operate each vehicle as a regularly scheduled vehicle. In the present embodiment, the status data D2 includes data indicating the number of waiting users, which is the number of users waiting by at least one stop on the route, and data indicating the number of on-board users, which is the number of users on board at least one vehicle. FIG. 5 illustrates the details of the process in step S105.

In step S301 of FIG. 5, the controller 11 detects the number of waiting users for at least one stop on the route. Specifically, the communication interface 13 receives the results of observations made by the second sensors 30 installed along the route. The controller 11 detects the number of waiting users by analyzing the images captured by the second sensor 30 and received by the communication interface 13. In the example in FIG. 8, the controller 11 detects the number of waiting users at the stop P1 by analyzing images captured by the second sensor 30 installed at the stop P1. For example, if one user is waiting at the stop P1 for the arrival of the vehicle B1, the controller 11 detects that the number of waiting users is one by analyzing the images that were captured by the second sensor 30 installed at the stop P1 and were received by the communication interface 13. As the image analysis method, a known method can be used. Machine learning, such as deep learning, may be used.

In step S302 of FIG. 5, the controller 11 detects the number of on-board users for at least one vehicle. Specifically, the communication interface 13 receives the results of observations made by the first sensor 20 installed in at least one vehicle among the plurality of vehicles B1, . . . , BN. The controller 11 detects the number of on-board users by analyzing the images captured by the first sensor 20 and received by the communication interface 13. In the example illustrated in FIG. 8, the controller 11 detects the number of on-board users in the vehicle B1 by analyzing images captured by the first sensor 20 installed in the vehicle B1. For example, if one user is on board the vehicle B1, the controller 11 detects that the number of on-board users is one by analyzing the images that were captured by the first sensor 20 installed in the vehicle B1 and were received by the communication interface 13. As the image analysis method, a known method can be used. Machine learning, such as deep learning, may be used.

In the present embodiment, step S302 is executed after step S301 is completed, but steps S301 and S302 may be executed in reverse order or simultaneously.

In the example illustrated in FIG. 8, the timing at which the controller 11 acquires the status data D2 is before the vehicle B1 arrives at the stops ahead. Assuming that the vehicle B1 is operated as a regularly scheduled vehicle from 7:00 a.m. on, the controller 11 analyzes each image acquired from the first sensor 20 and the second sensor 30 before the vehicle arrives at the stop P1, for example at 7:05 a.m., to acquire the status data D2 that includes the data indicating the number of on-board users on the vehicle B1 and the data indicating the number of waiting users at the stop P1. It is assumed that, as a result of the analysis, one user is detected as the number of on-board users and one user is detected as the number of waiting users for the vehicle B1. In this case, the controller 11 stores, in the memory 12, status data D2 that includes data indicating that the number of on-board users is one and the number of waiting users is one.

Figure 6:
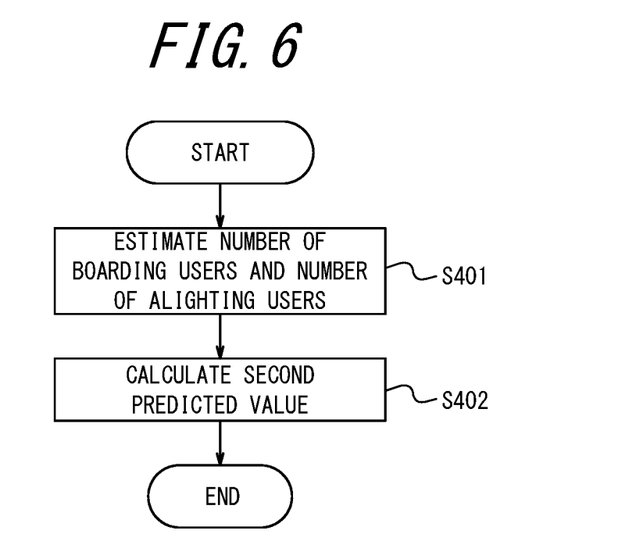
FIG. 6 is a diagram illustrating the details of a process to predict ride demand.

In step S106, the controller 11 of the operation management apparatus 10 predicts the ride demand during the remaining time of the time slot TX based on the status data D2 acquired in step S105. As a result, a second predicted value of the ride demand during the remaining time of the time slot TX is obtained. FIG. 6 illustrates the details of the process in step S106.

Figure 11:
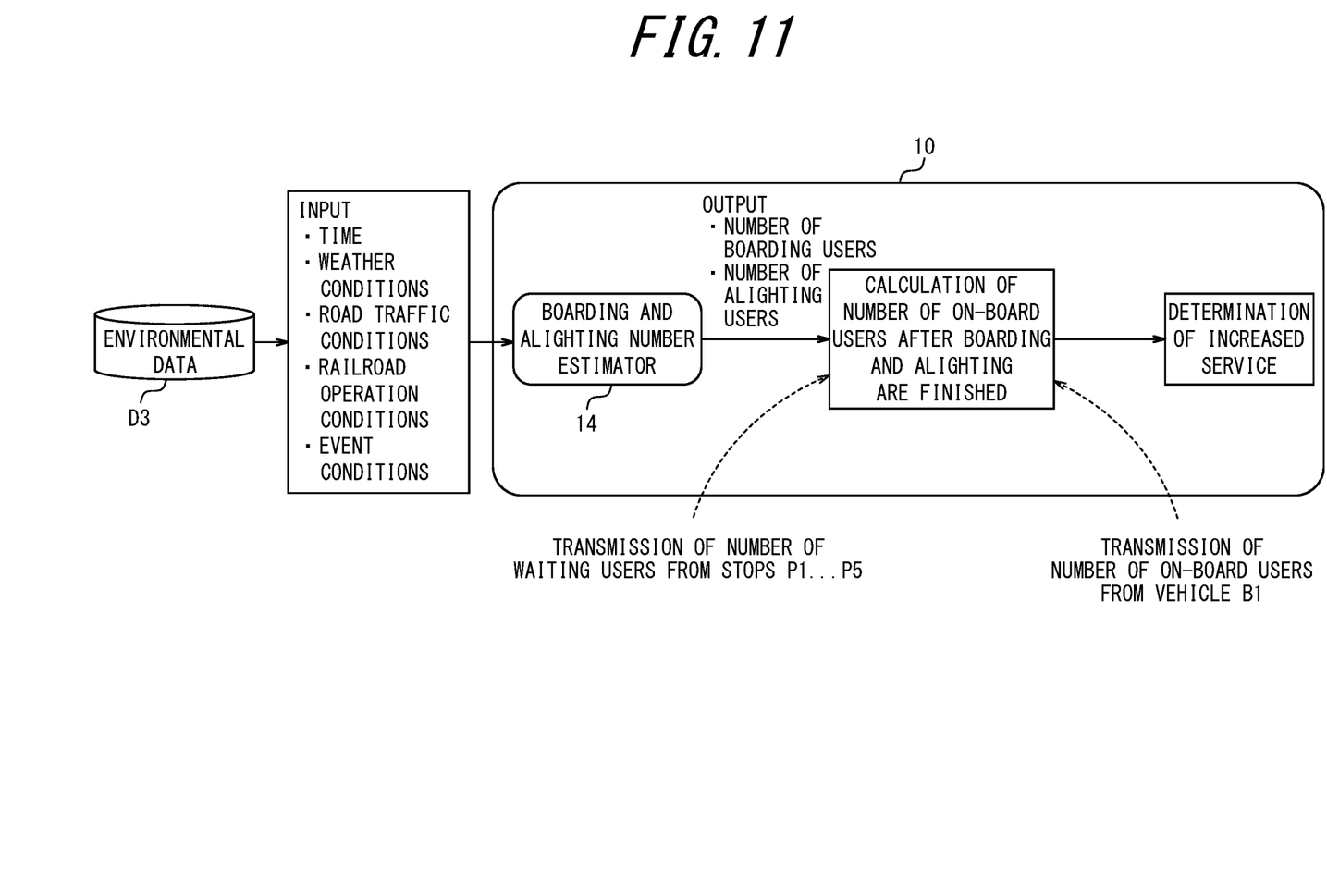
FIG. 11 is a diagram illustrating a specific example of the determination to increase service.

In step S401 of FIG. 6, the controller 11 estimates, for at least one vehicle, the number of boarding users, which is the number of users who are to board at at least one stop on the route, and the number of alighting users, which is the number of users who are to alight at at least one stop. Specifically, the controller 11 retrieves environmental data D3 from the memory 12 indicating environmental conditions around at least one stop and calculates the estimated number of boarding users and the estimated number of alighting users. The input may include the time, as illustrated in FIG. 11. The environmental data D3 is stored in the memory 12 in the present embodiment but may be stored in an external storage. In the present embodiment, the environmental conditions include weather conditions, road traffic conditions, railroad operation conditions, and event conditions. The data indicating weather conditions included in the environmental data D3 is, for example, data related to the weather, such as weather forecasts provided by the Japan Meteorological Agency. The data indicating road traffic conditions included in the environmental data D3 is, for example, data on traffic jams and traffic regulations provided by the Japan Road Traffic Information Center. The data indicating the railroad operation conditions included in the environmental data D3 is, for example, data provided by a railroad operator regarding free alternative transportation due to suspended railroad operation. The data indicating the event conditions included in the environmental data D3 is, for example, data on the venue, event schedule, and the like provided by the organizer of a sporting event or concert event. The controller 11 increases or decreases the estimated number of boarding users and the estimated number of alighting users according to the environmental conditions, including the weather conditions, road traffic conditions, railroad operation conditions, and event conditions, indicated by the environmental data D3. For example, it is assumed that a stadium for sporting events is located in the vicinity of a certain stop. At this stop, the number of boarding users and the number of alighting users vary greatly depending on the status of the sporting event. In a case in which a sporting event starts during the time slot TX, the controller 11 calculates a higher value as the estimated number of alighting users than during the same time slot on days when no sporting event is held. In a case in which a sporting event ends during the time slot TX, the controller 11 calculates a higher value as the estimated number of boarding users than during the same time slot on days when no sporting event is held. In the present embodiment, the estimated number of boarding users and the estimated number of alighting users are calculated as illustrated in FIG. 11 by the controller 11 using a boarding and alighting number estimator 14 that takes the environmental conditions around at least one stop as input and outputs the estimated number of boarding users and number of alighting users. Machine learning, such as deep learning, may be used to calculate the estimates.

In step S402 of FIG. 6, in addition to the status data D2 acquired in steps S301 and S302, the controller 11 calculates the second predicted value of the ride demand during the remaining time in the time slot TX based on the estimated number of boarding users and the estimated number of alighting users calculated in step S401. Specifically, the controller 11 calculates the second predicted value with the following equation. Second predicted value=number of on-board users+Max(number of waiting users, estimated number of boarding users)−estimated number of alighting users In the above equation, "Max(number of waiting users, estimated number of boarding users)" indicates the larger of the detected number of waiting users and the estimated number of boarding users, i.e., the maximum value. In the present embodiment, the maximum value is calculated taking into consideration that the number of users waiting for the arrival of a vehicle may increase after the number of waiting users is detected, but a representative value such as an average value may be calculated. As a first example, it is assumed that one is detected in step S302 as the number of on-board users, one is detected in step S301 as the number of waiting users, and two is obtained as the estimated number of boarding users and zero as the estimated number of alighting users in step S401. In this case, the second predicted value is calculated as 1+Max(1,2)−0=3 using the above equation. In other words, the second predicted value indicates the number of users who are expected to be on board the vehicle B1 after boarding and alighting are finished at the stop P1. As a second example, it is assumed that eight is detected in step S302 as the number of on-board users, seven is detected in step S301 as the number of waiting users, and eight is obtained as the estimated number of boarding users and two as the estimated number of alighting users in step S401. In this case, the second predicted value is calculated as 8+Max(7,8)−2=14 using the above equation.

In the example illustrated in FIG. 8, the timing at which the controller 11 acquires the environmental data D3 is before the vehicle B1 arrives at the stops ahead, as in the case of the status data D2. The controller 11 reads, from the memory 12, the estimated number of boarding users and the estimated number of alighting users in addition to the status data D2 indicating the number of on-board users and the number of waiting users. The controller 11 applies these pieces of data and estimated values to the above equation to acquire a value, as the second predicted value, that indicates the number of users expected to be on board the vehicle B1 after the boarding and alighting are finished at the stop P1.

In this way, the controller 11 predicts the ride demand during the remaining time of the time slot TX based on the estimated number of boarding users and number of alighting users in addition to the acquired status data D2.

In step S107, the controller 11 of the operation management apparatus 10 determines whether the second predicted value of the ride demand obtained in step S106 is higher than the second threshold, which is a fixed value specific to at least one vehicle. In other words, the controller 11 determines whether to increase service. Specifically, the controller 11 sets the capacity of at least one vehicle as the second threshold. The controller 11 determines whether the second predicted value is higher than the second threshold. For example, in a case in which the capacity of at least one vehicle is 10 people, in the first example described above, the second predicted value is determined to be equal to or less than the second threshold, and in the second example, the second predicted value is determined to be higher than the second threshold.

Figure 3:
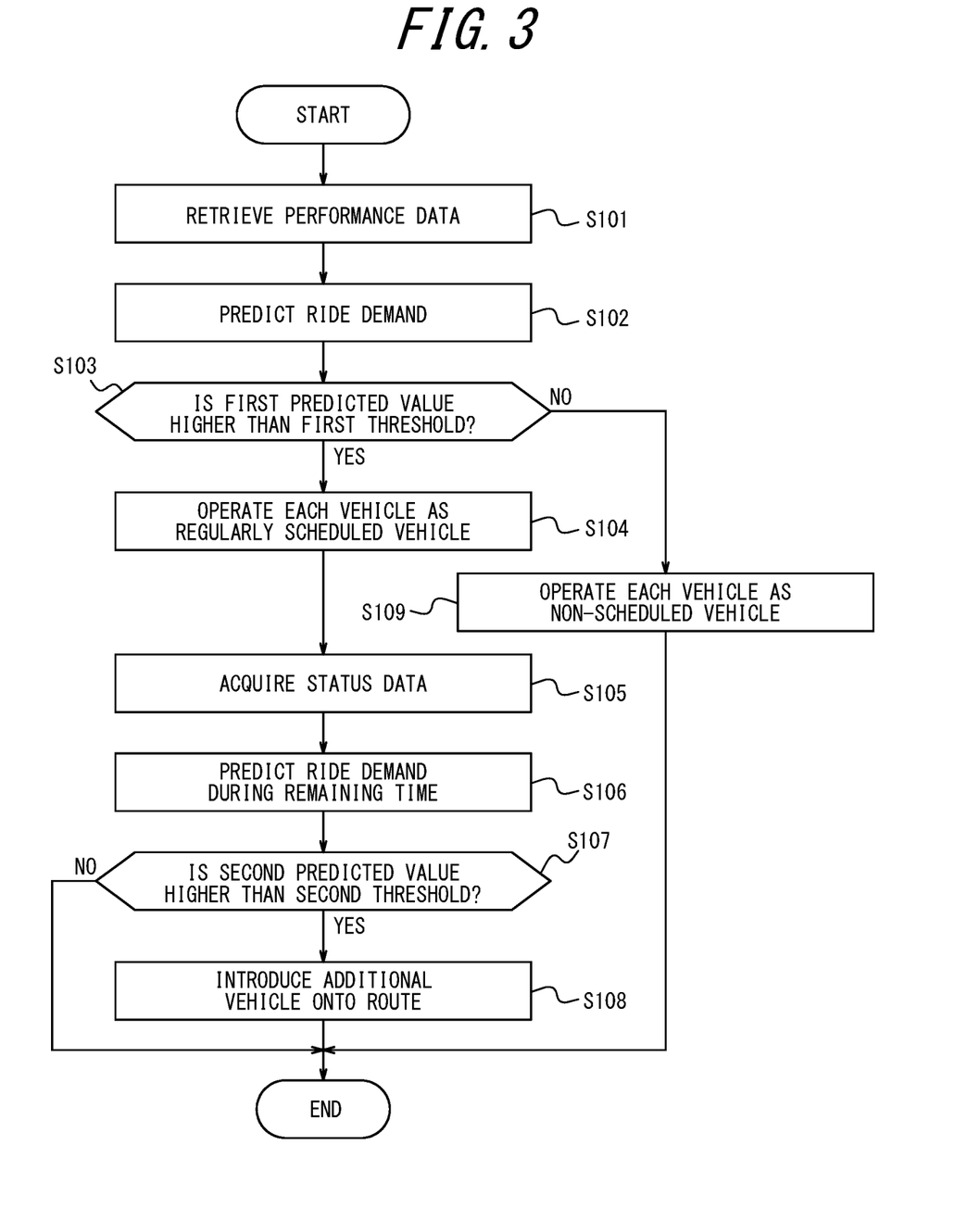
FIG. 3 is a flowchart illustrating operations of the operation management apparatus according to an embodiment of the present disclosure.
Figure 10:
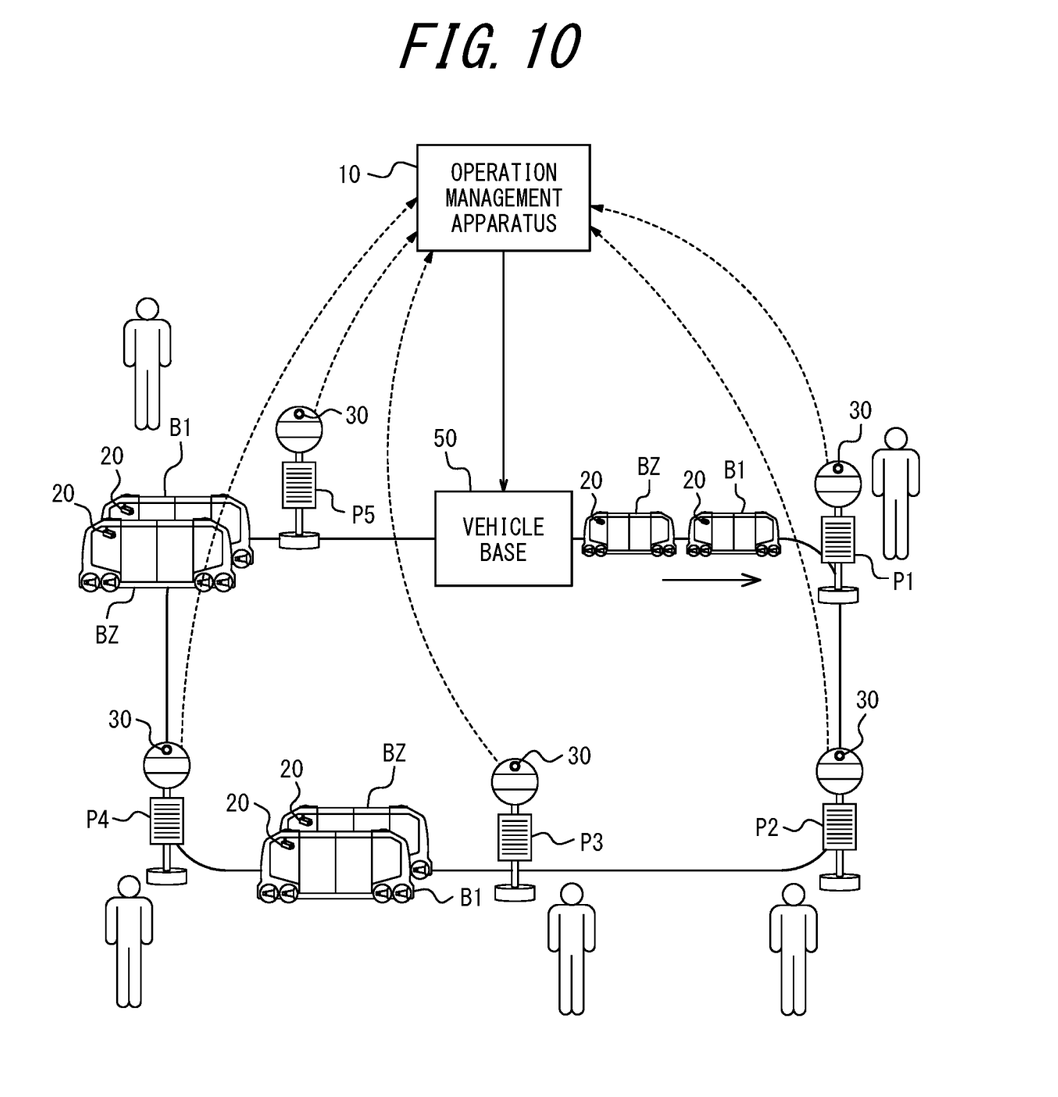
FIG. 10 is a diagram illustrating a specific example of an increased service operation mode.

The flow in FIG. 3 ends in a case in which the second predicted value is determined to be equal to or less than the second threshold. That is, the controller 11 maintains the operation mode during the remaining time of the time slot TX in the regular fixed route operation mode M1. On the other hand, the controller 11 determines in step S108 to introduce an additional vehicle onto the route during the remaining time of the time slot TX in a case in which the second predicted value is determined to be equal to or less than the second threshold. That is, the controller 11 switches the operation mode to the increased service mode M3. FIG. 10 illustrates a specific example of the increased service mode M3. In the example illustrated in FIG. 8, it is assumed that the determination to increase service is made before the vehicle B1 arrives at the stop P1, for example, at 7:05. In a case in which the second predicted value is determined to be higher than the second threshold as a result of the determination to increase service, a vehicle BZ is introduced onto the route as an additional vehicle for the remaining time, i.e., from 7:05 to 7:59, as illustrated in FIG. 10. The vehicle BZ departs from the vehicle base 50 following the vehicle B1 and before the vehicle B2, and like the vehicle B1, the vehicle BZ stops in order from stops P1 to P5 repeatedly and then returns to the vehicle base 50.

In the present embodiment, the flow in FIG. 3 is terminated in a case in which the second predicted value is determined to be equal to or less than the second threshold in step S107, but after the determination in step S107, the process from step S105 onward may be repeated until the remaining time in the time slot TX elapses. In other words, the determination of whether to increase service may be made multiple times. For example, the controller 11 may repeat the process from step S105 onward at regular intervals, for example at 5 minute intervals. In the present embodiment, the flow in FIG. 3 ends after the additional vehicle is introduced onto the route in step S108, but after the process of step S108, the process from step S105 onward may be executed again until the remaining time in the time slot TX elapses. In the example illustrated in FIG. 10, when the second predicted value of the ride demand is determined to be equal to or less than the second threshold before the time remaining in the time slot TX has elapsed, the vehicle BZ may return to the vehicle base 50 immediately after all users have alighted from the vehicle BZ.

In this way, the controller 11 acquires status data D2 indicating the existence status of at least one user when each vehicle is operated as a regularly scheduled vehicle. Based on the acquired status data D2, the controller 11 predicts the ride demand during the remaining time of the time slot TX. The controller 11 determines to introduce an additional vehicle onto the route for the remaining time in a case in which the resulting second predicted value of the ride demand is higher than the second threshold.

According to the present embodiment, operation of vehicles in response to increases or decreases in ride demand is facilitated by predicting the ride demand during the time slot TX in which each vehicle operates and during the remaining time of the time slot TX.

In the present embodiment, the controller 11 of the operation management apparatus 10 generates the operation mode table MT illustrated in FIG. 7 by repeating the processing sequence of steps S101 to S103 and S104 or S109 a total of 19 times, with the time slot TX as each of the time slots from 6:00 through 24:00. For example, when setting the time slot TX to the 6:00 time slot, the controller 11 sets the operation mode during that time to the semi-demand operation mode M2 as a result of the processing in steps S101 through S103 and S109. The "6:00 time slot" is the time slot between 6 and 7 o'clock, i.e., including 6:00 and not including 7:00. The "6:00 time slot" refers precisely to the period from 6:00:00 to 6:59:59, but in FIG. 7 this is indicated by hours and minutes as "6:00 to 6:59" for the sake of convenience. The same is true for other time slots as well. Similarly, when setting the time slot TX to each of the 11:00 through 16:00 time slots and 21:00 through 24:00 time slots, the controller 11 sets the operation mode during each time slot to the semi-demand operation mode M2 as a result of the processing in steps S101 through S103 and S109. For example, when setting the time slot TX to the 7:00 time slot, the controller 11 sets the operation mode during that time slot to the regular fixed route operation mode M1 as a result of the processing in steps S101 through S104. Similarly, when setting the time slot TX to each of the 8:00 through 10:00 time slots and the 17:00 through 20:00 time slots, the controller 11 sets the operation mode during each time slot to the regular fixed route operation mode M1.

Figure 4:
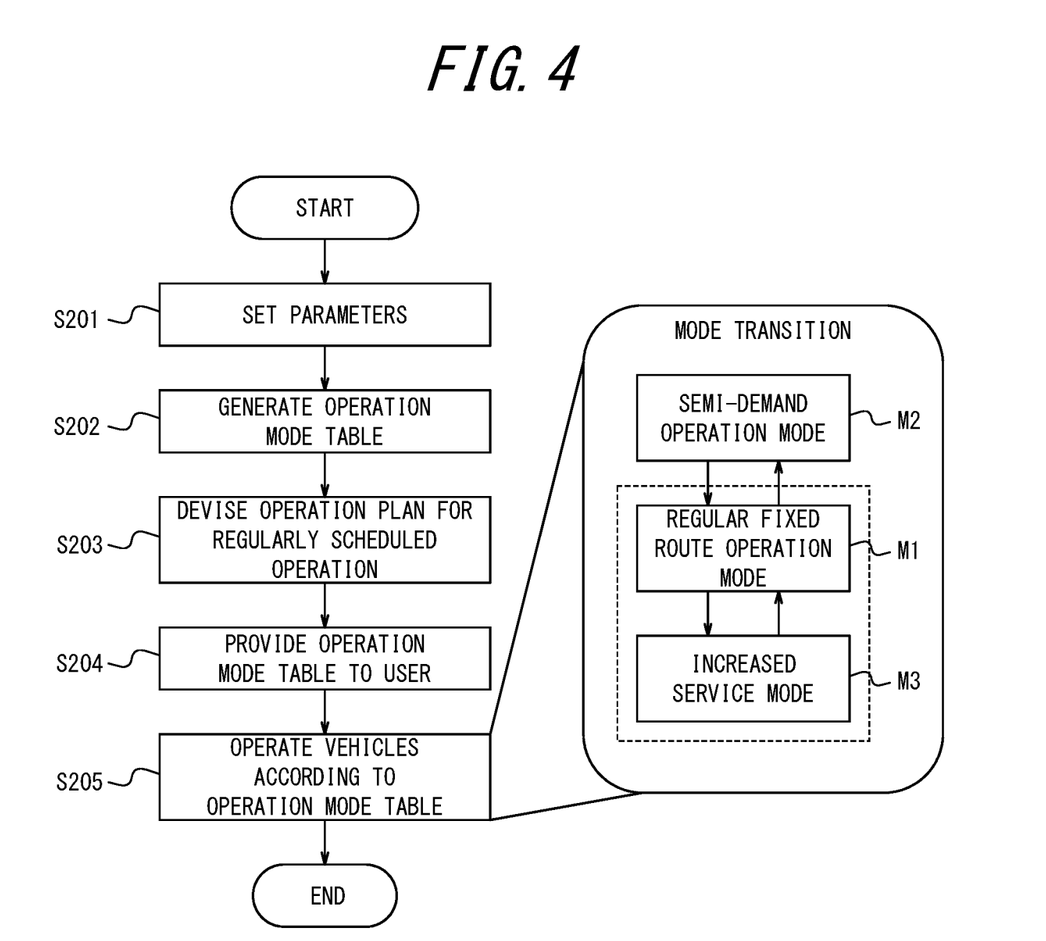
FIG. 4 is a flowchart illustrating operations related to an operation mode table according to an embodiment of the present disclosure.

Referring to FIG. 4, operations related to the operation mode table MT are described.

In step S201, the controller 11 of the operation management apparatus 10 sets the parameters necessary for the operation of the vehicles. Specifically, the controller 11 establishes the route on which to operate the plurality of vehicles B1, . . . , BN and the stops P1, . . . , PL where each vehicle is to stop.

In step S202, the controller 11 generates the operation mode table MT as illustrated in the lower tier of FIG. 7 based on the performance data D1. As illustrated in FIG. 7, data indicating the specific time slots for the regular fixed route operation mode M1 and the specific time slots for the semi-demand operation mode M2 is stored in the operation mode table MT. In the example in FIG. 7, data indicating the 7:00 through 10:00 times slots and the 17:00 through 20:00 time slots are stored in the operation mode table MT as the time slots for the regular fixed route operation mode M1. Furthermore, data indicating the 6:00, 11:00 through 16:00, and 21:00 through 24:00 time slots are stored in the operation mode table MT as the time slots for the semi-demand operation mode M2.

In step S203, the controller 11 of the operation management apparatus 10 devises an operation plan for regularly scheduled operation. The "operation plan for regularly scheduled operation" refers to the operation schedule of regularly scheduled vehicles in the regular fixed route operation mode M1. Specifically, the operation plan for regularly scheduled vehicles includes data indicating when and where the regularly scheduled vehicles are to stop, i.e., the stops where the regularly scheduled vehicles are to stop and the corresponding stop times. A known method can be used to devise the operation plan for regularly scheduled operation. Machine learning, such as deep learning, may be used.

In step S204, the controller 11 of the operation management apparatus 10 provides the user with the operation mode table MT. Any appropriate method may be used to provide the operation mode table MT, but in the present embodiment, a method to display the content of the operation mode table MT on the display or output the content from the speaker of an electronic signboard installed on the route, a method to post the content on the web site of the operation manager, a method to display the content on the display or output the content from the speaker of the terminal apparatuses U1, . . . , UM of the users, or a combination of these methods is used.

In step S205, the controller 11 of the operation management apparatus 10 operates the plurality of vehicles B1, . . . , BN according to the operation mode table MT. Specifically, the controller 11 causes the plurality of vehicles B1, . . . , BN to travel along the route as regularly scheduled vehicles during the time slots in the regular fixed route operation mode M1 and as non-scheduled vehicles during the time slots in the semi-demand operation mode M2.

According to the present embodiment, operation of vehicles in response to increases or decreases in ride demand is facilitated by prediction of the ride demand by users for each vehicle among the plurality of vehicles B1, . . . , BN based on the performance data D1, the status data D2, and the environmental data D3.

In a variation of the present embodiment, the controller 11 of the operation management apparatus 10 may, in addition to the status data, predict the ride demand during the remaining time based on the number of users who are on board at least one vehicle and who have indicated their intention to alight. In this case, the indication of the user's intention to alight is detected via an input device, such as alighting buttons installed in each vehicle, or via the terminal apparatus of the user who indicates an intention to alight among the terminal apparatuses U1, . . . , UM.

The present disclosure is not limited to the embodiment described above. For example, two or more blocks described in the block diagrams may be integrated, or a block may be divided. Instead of executing two or more steps described in the flowcharts in chronological order in accordance with the description, the steps may be executed in parallel or in a different order according to the processing capability of the apparatus that executes each step, or as required. Other modifications can be made without departing from the spirit of the present disclosure.

The invention claimed is:

1. An operation management apparatus comprising a controller configured to:
   acquire performance data indicating a usage record of a plurality of vehicles that each travels along a route, wherein each vehicle is an autonomous vehicle;
   predict, based on the performance data, a ride demand during a time slot in which each vehicle is operated, thereby obtaining a first predicted value of the ride demand during the time slot;
   determine to operate, during the time slot, each vehicle as a regularly scheduled vehicle that is to stop at each stop among a plurality of predetermined stops on the route at a corresponding time defined in a predetermined schedule, in a case in which the first predicted value is higher than a first threshold, and upon so determining, cause each vehicle to set an operation mode to be operated as the regularly scheduled vehicle during the time slot;
   determine to operate, during the time slot, each vehicle as a non-scheduled vehicle that is to be dispatched in response to an individual request from a user and to stop at a stop designated by the user from among the plurality of predetermined stops on the route at a time designated by the user regardless of the predetermined schedule, in a case in which the first predicted value is equal to or less than the first threshold, and upon so determining, cause each vehicle to set the operation mode to be operated as the non-scheduled vehicle during the time slot;
   acquire status data indicating an existence status of at least one user when each vehicle is operated as the regularly scheduled vehicle during the time slot;
   predict a ride demand during a remaining time of the time slot based on the status data, thereby obtaining a second predicted value of the ride demand during the remaining time of the time slot; and
   determine to introduce an additional vehicle that is another autonomous vehicle onto the route for the remaining time in a case in which the second predicted value is higher than a second threshold, and upon so determining, cause the additional vehicle to start traveling the route.

2. The operation management apparatus according to claim 1, wherein the status data includes data indicating a number of on-board users, which is a number of users on board at least one vehicle.

3. The operation management apparatus according to claim 2, further comprising a communication interface configured to receive a result of observation by a first sensor installed in each vehicle, wherein
   the controller is configured to acquire data indicating the number of on-board users by detecting the number of on-board users according to the result of observation received by the communication interface.

4. The operation management apparatus according to claim 3, wherein
   the first sensor is a camera, and
   as the result of observation, the controller is configured to detect the number of on-board users by analyzing an image captured by the camera.

5. The operation management apparatus according to claim 1, wherein the status data includes data indicating a number of waiting users, which is a number of users waiting by at least one stop on the route.

6. The operation management apparatus according to claim 5, further comprising a communication interface configured to receive a result of observation by a second sensor installed on the route, wherein
   the controller is configured to acquire data indicating the number of waiting users by detecting the number of waiting users according to the result of observation received by the communication interface.

7. The operation management apparatus according to claim 6, wherein
   the second sensor is a camera, and
   as the result of observation, the controller is configured to detect the number of waiting users by analyzing an image captured by the camera.

8. The operation management apparatus according to claim 1, wherein in addition to the status data, the controller is configured to predict the ride demand during the remaining time based on a number of users who are on board at least one vehicle and who have indicated their intention to alight.

9. The operation management apparatus according to claim 1, wherein in addition to the status data, the controller is configured to predict the ride demand during the remaining time based on an estimated number of boarding users, which is a number of users who are to board at least one vehicle at at least one stop on the route, and an estimated number of alighting users, which is a number of users who are to alight from the at least one vehicle at the at least one stop.

10. The operation management apparatus according to claim 9, further comprising a communication interface configured to receive environmental data indicating environmental conditions around the at least one stop, wherein
the controller is configured to calculate the estimated number of boarding users and the estimated number of alighting users based on the environmental data received by the communication interface.

11. The operation management apparatus according to claim 10, wherein the environmental conditions include weather conditions.

12. The operation management apparatus according to claim 10, wherein the environmental conditions include road traffic conditions.

13. The operation management apparatus according to claim 10, wherein the environmental conditions include railroad operation conditions.

14. The operation management apparatus according to claim 10, wherein the environmental conditions include event conditions.

15. The operation management apparatus according to claim 1, wherein the performance data includes data indicating a number of users who used the plurality of vehicles during each time slot.

16. The operation management apparatus according to claim 1, wherein the first threshold varies according to an operation date on which each vehicle is operated.

17. The operation management apparatus according to claim 1, wherein
the second predicted value indicates a number of users expected to be on board at least one vehicle after completion of boarding and alighting at at least one stop, and
the second threshold is a fixed value specific to the at least one vehicle.

18. The operation management apparatus according to claim 1, wherein the plurality of vehicles and the additional vehicle are circulating buses.

19. A system comprising:
the operation management apparatus according to claim 1;
the plurality of vehicles; and
the additional vehicle.

20. An operation management method comprising:
acquiring performance data indicating a usage record of a plurality of vehicles that each travels along a route, wherein each vehicle is an autonomous vehicle;
predicting, based on the performance data, a ride demand during a time slot in which each vehicle is operated, thereby obtaining a first predicted value of the ride demand during the time slot;
determining to operate, during the time slot, each vehicle as a regularly scheduled vehicle that is to stop at each stop among a plurality of predetermined stops on the route at a corresponding time defined in a predetermined schedule, in a case in which the first predicted value is higher than a first threshold, and upon so determining, causing each vehicle to set an operation mode to be operated as the regularly scheduled vehicle during the time slot; and
determining to operate, during the time slot, each vehicle as a non-scheduled vehicle that is to be dispatched in response to an individual request from a user and to stop at a stop designated by the user from among the plurality of predetermined stops on the route at a time designated by the user regardless of the predetermined schedule, in a case in which the first predicted value is equal to or less than the first threshold, and upon so determining, causing each vehicle to set the operation mode to be operated as the non-scheduled vehicle during the time slot;
acquiring status data indicating an existence status of at least one user when each vehicle is operated as the regularly scheduled vehicle during the time slot;
predicting a ride demand during a remaining time of the time slot based on the status data, thereby obtaining a second predicted value of the ride demand during the remaining time of the time slot; and
determining to introduce an additional vehicle that is another autonomous vehicle onto the route for the remaining time in a case in which the second predicted value is higher than a second threshold, and upon so determining, causing the additional vehicle to start traveling the route.

* * * * *